United States Patent
Pfeiffer et al.

(10) Patent No.: US 6,434,776 B1
(45) Date of Patent: Aug. 20, 2002

(54) TUBE SCRAPING DEVICE

(75) Inventors: Dominique Pfeiffer, Ermenonville; Patrick Lecointe, Bouffemont, both of (FR)

(73) Assignee: Gaz de France (GDF) Service National, Paris (FR)

( * ) Notice: Subject to any disclaimer, the term of this patent is extended or adjusted under 35 U.S.C. 154(b) by 0 days.

(21) Appl. No.: 09/763,378

(22) PCT Filed: Jun. 20, 2000

(86) PCT No.: PCT/FR00/01698
§ 371 (c)(1),
(2), (4) Date: Feb. 21, 2001

(87) PCT Pub. No.: WO00/78486
PCT Pub. Date: Dec. 28, 2000

(30) Foreign Application Priority Data

Jun. 22, 1999 (FR) .............................. 99 07945

(51) Int. Cl.⁷ ................................ B08B 9/23
(52) U.S. Cl. ................................... 15/104.04
(58) Field of Search .................... 15/104.03, 104.04, 15/105

(56) References Cited

U.S. PATENT DOCUMENTS 5,600,862 A * 2/1997 Bleske et al.

FOREIGN PATENT DOCUMENTS

| BE | 882 419 A | 7/1980 |
| DE | 296 12 667 U1 | 9/1996 |
| EP | 0 689 928 A2 | 1/1996 |

* cited by examiner

Primary Examiner—Terrence R. Till
(74) Attorney, Agent, or Firm—Skinner And Associates

(57) ABSTRACT

The invention concerns a manual scraping device (10) by rotation about the external surface of a tube (112) of plastics material, comprising an annular structure (11) having a passage (20) which is to receive the tube in order to guide it and a blade (30) secured to the annular structure (11). The passage extends right through the annular structure and is partially obstructed by a shoulder (50) defining a region (52) for restricting the passage, so that the shoulder defines an abutment for a non-scraped portion of the tube and permits the passage of a scraped portion of the tube through the restriction.

10 Claims, 4 Drawing Sheets

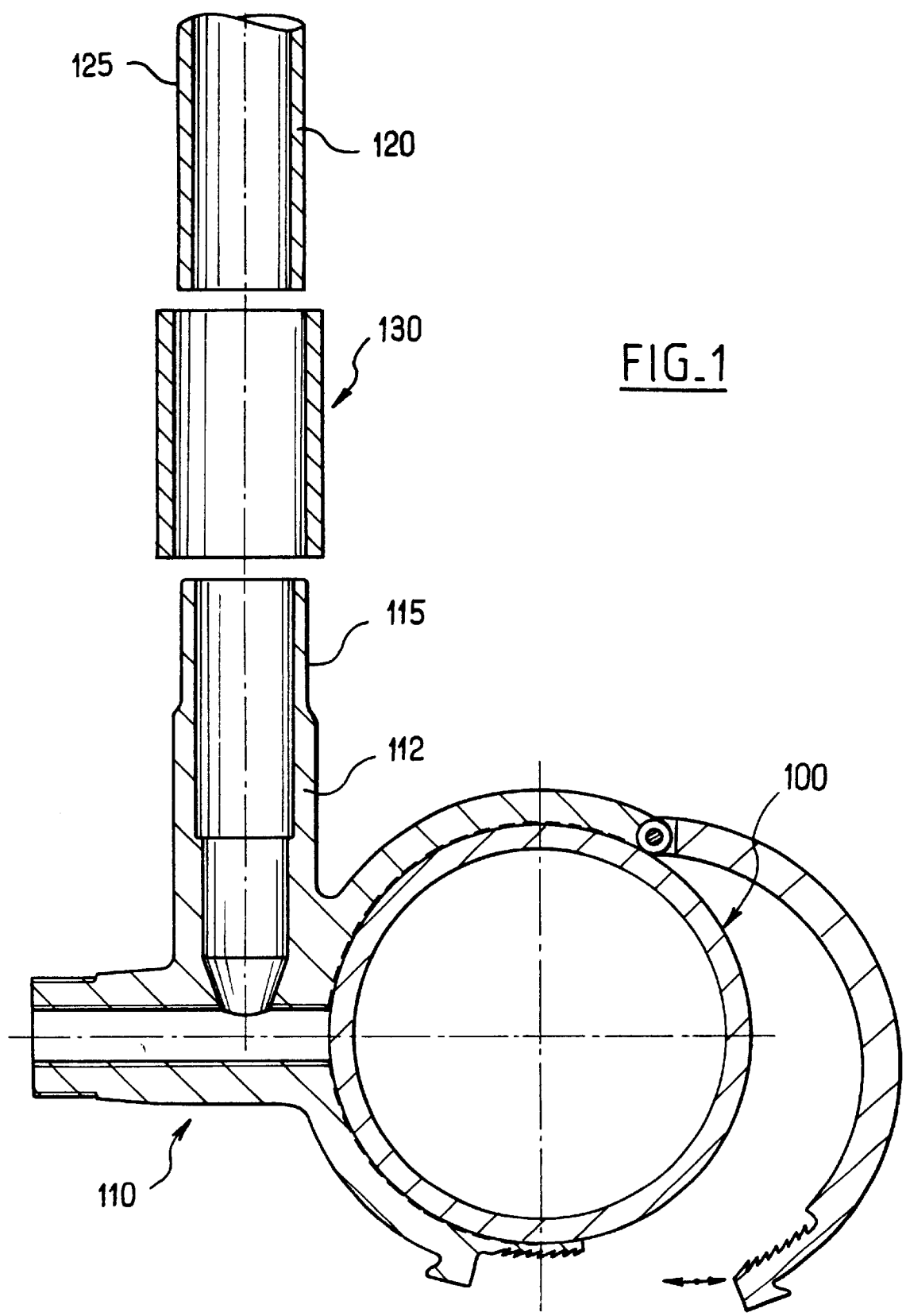
FIG_1

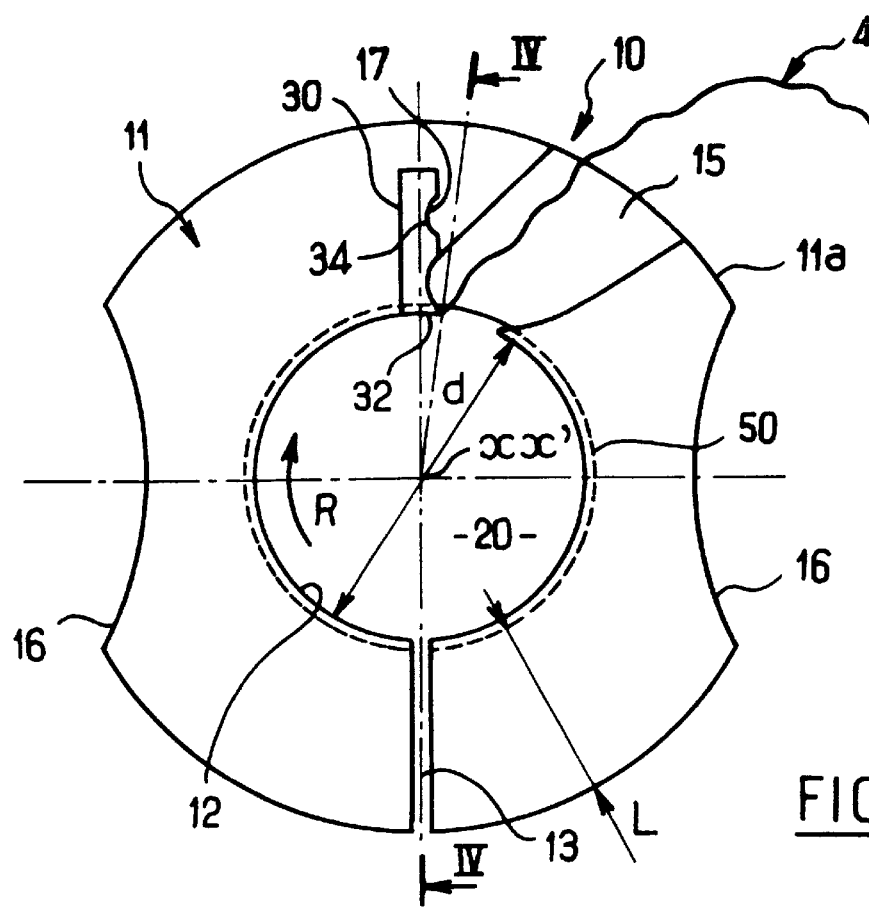
FIG_2
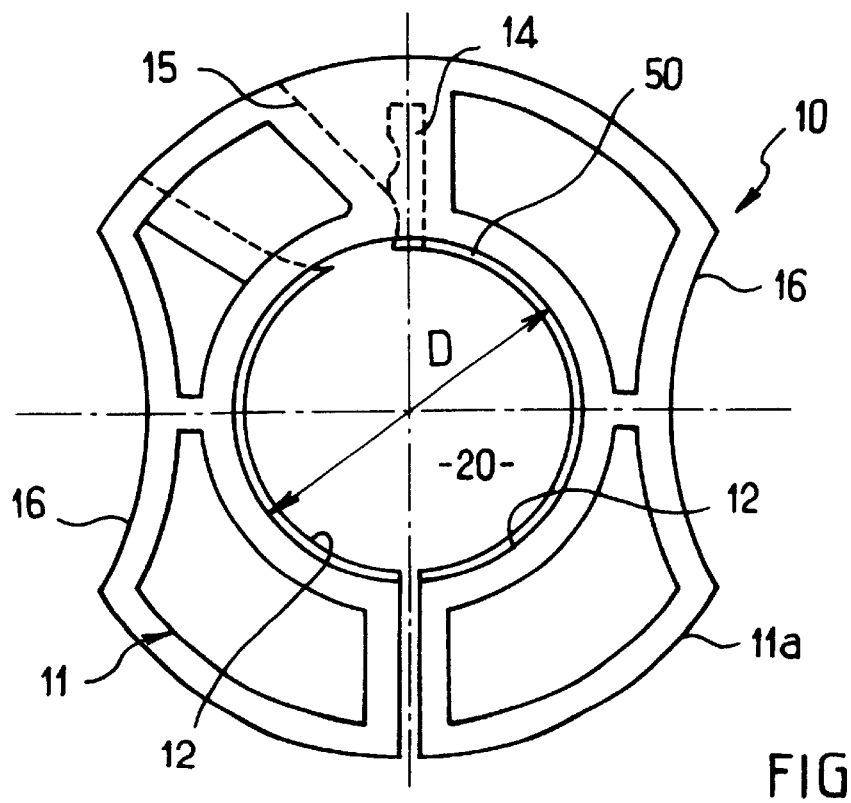
FIG_3

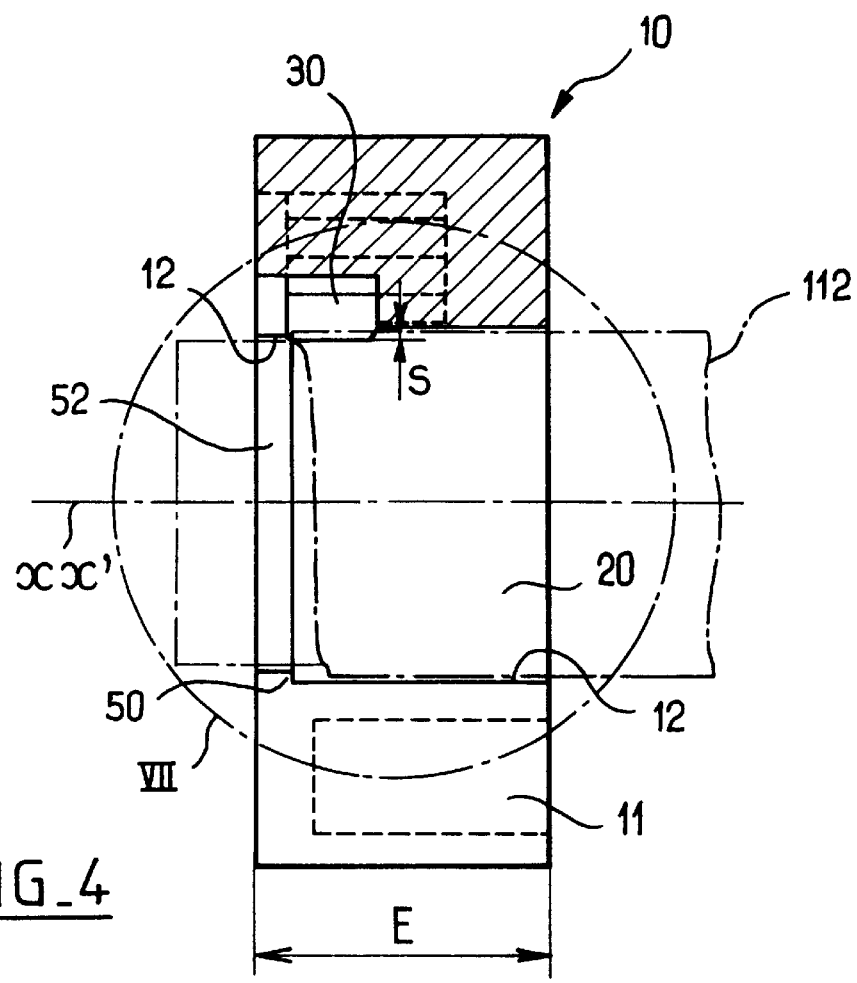
FIG_4
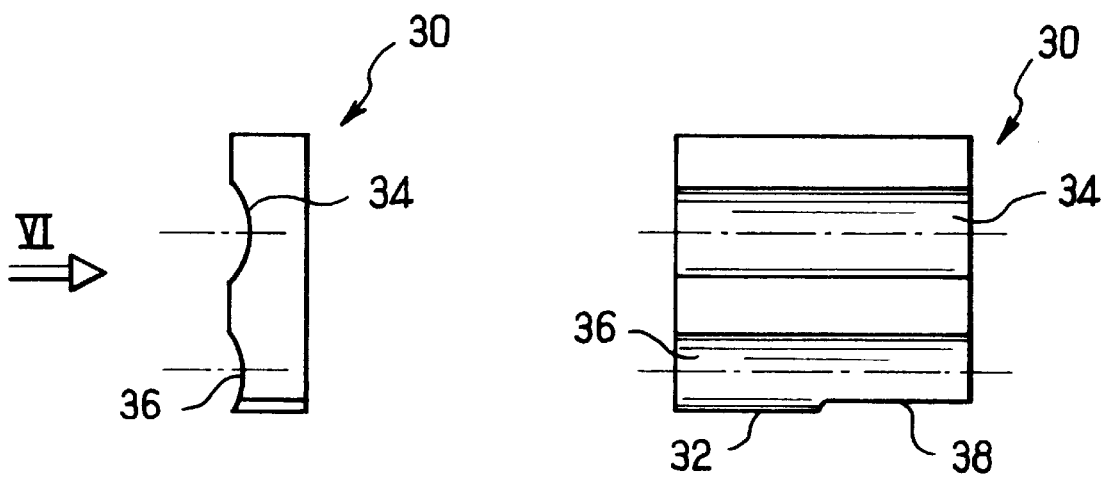
FIG_5          FIG_6

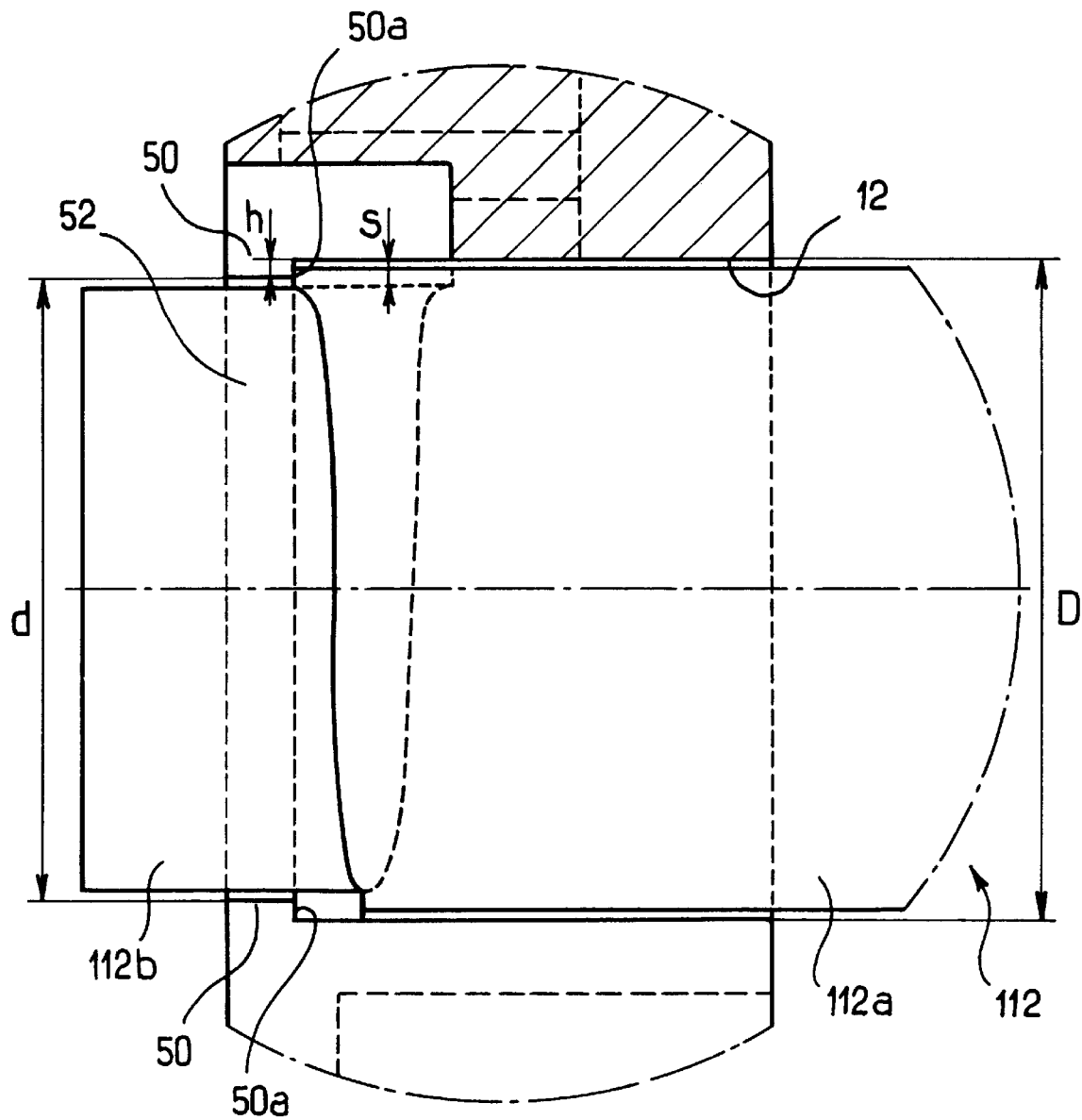
FIG_7

TUBE SCRAPING DEVICE

This application a National Stage application under 35 U.S.C. 371 and claims priority of PCT Application No.: PCT/FR00/01698 filed on Jun. 20, 2000 French Application No: FR 99 07945 filed on Jun. 22, 1999, which are hereby incorporated by reference.

BACKGROUND OF THE INVENTION

The field of the present invention is that of devices used to improve the surface state of a portion of a duct, for example before it is welded to another duct, and in particular the field of manual devices for scraping by rotation about the external surface of a portion of a main feed duct for natural gas before it is connected to a secondary duct, by way of a connecting pipe.

Within the framework of the technique known as the polyethylene technique, the connection of two ducts in which, for example, natural gas circulates, or more precisely the connection of the branch of a connecting pipe to a secondary duct, is effected by the electrical welding of a sleeve around those two tubular parts. In order for welding to be effective, it is preferable to remove the oxidised external surface of the secondary duct and of the branch of the connecting pipe. Therefore, in order to obtain good welding, it is necessary to scrape those parts beforehand. This scraping is generally carried out by means of a scraper of the paint scraper type (wooden handle provided with a transverse metal blade). Scraping with this type of tool is not uniform and the thickness of the material removed is not controlled. The scraped tubular elements have, in particular, a large number of facets. Furthermore, the scraping of the lower portion of the tubular element is not easy and can cause large scratches when the tool slips.

Annular scrapers have also been produced in the past, like that described in EP-A-0 649 694. Owing to the fact that those scrapers are designed for straight-bar tubing, they are not always efficient on ovalised tubes having a given radius of curvature (tubes having a small diameter are delivered in coils). In addition, this tool is very complex to manufacture, and therefore expensive, and must be handled with some care given the number of parts of which it is composed.

In addition, document BE-A-882 419 describes a shaving tool for tubes comprising:
an annular structure having a passage which extends along a principal axis and which is delimited by an internal peripheral surface of the annular structure which is to receive the tube tightly in order to guide it,
a blade secured to the annular structure and having a cutting edge extending beyond the internal peripheral surface to form a projection into the passage.

However, that tool is used basically to dress and bevel the tube by means of two blades arranged perpendicularly, so that the operation for scraping the external surface of the tube can be carried out only over a short distance relative to the end of the tube. Consequently, the tool does not enable the connecting pipe to be welded satisfactorily afterwards.

BRIEF SUMMARY OF THE INVENTION

The solution of the invention which enables the tube to be surface-improved, in other words, which enables its external surface to be scraped over a satisfactory length, consists in that the passage extends right through the annular structure and is partially obstructed by a shoulder defining a region restricting the passage, the shoulder having a height, relative to the internal peripheral surface of the annular structure, which is slightly smaller than that of the projection formed by the cutting edge relative to the internal peripheral surface of the annular structure, so that the shoulder defines an abutment for a non-scraped portion of the tube and permits the passage of a scraped portion of the tube through the restriction.

Thus, a portion of the tube cannot come out of the device again unless all of that portion has been completely surface-improved. In other words, the device itself regulates its advance relative to the tube along the principal axis by not permitting such advance unless scraping of the previously scraped tube portion has been effected completely. Under those conditions, there is no risk of scraping in the shape of a helix while leaving non-scraped tube portions inside the helix.

In addition, the invention proposes that the cutting edge extend axially in the passage, at a distance from the shoulder and at least as far as the limit of the region for restricting the passage, and even partially into that region.

Thus, by maintaining a pushing force on the device combined with a rotating force, the device advances automatically relative to the tube as the scraping thereof progresses, so that continuous surface-improvement is in fact effected.

The invention also proposes that the device advantageously have the following features:
the annular structure is slightly flexible and has a thickness along the principal axis and a width radial to that axis,
the annular structure has a radial slot extending through the entire thickness and the entire width of the annular structure, and
the radial slot is substantially diametrically opposite the blade.

Thus, the annular structure can be deformed in such a manner as to absorb, both when placed in position and during the scraping operation, slight deformation in the diameter of the tube, such as any ovalisation of the tubular element to be scraped. The slot also permits manual modulation of the gripping of the tube and of the thickness of the shaving to some extent.

In order to provide for a good variation in the inside diameter of the passage of the annular structure, the slot of the annular structure extends substantially along the principal axis of the annular structure.

In order to improve the discharge of the shaving, the annular structure preferably has a radial opening which extends over a portion of the annular thickness of the structure and radially over the entire width of the annular structure, the blade extending at least partially into or as an extension of the opening in order to remove the shaving formed during scraping.

In order to make the device easy to produce and light in weight, the invention proposes that the annular structure advantageously be partially hollowed out and produced from plastics material(s).

According to another aspect of the invention, the annular structure has recessed shapes on its external surface which enable the device to be gripped in the hand, in particular concave shapes adapted to receive the thumb and the index finger or the middle finger of a hand. Gripping in the hand is therefore improved in order to cause the device to rotate easily about the tube and to ensure regular circumferential (helical) scraping which is easy to effect because it requires only slight pressure of the user's fingers.

In order to improve scraping and the formation of the shaving, the blade has, in cross-section, an inwardly curved notch near one end of its cutting edge.

In order to reduce manufacturing costs without reducing the performance of the device, the blade is preferably adhesively bonded in a recess in the annular structure and has a scallop or a protuberance, the shape of which is suitable for fitting a complementary shape formed in the recess of the annular structure, in order to lock the blade laterally in rotation. Thus, while being adhesively bonded, the blade is nonetheless held mechanically by interference in order to prevent any scraping defect caused by inadvertent movement thereof when the device is rotated.

Furthermore, in order to improve the support of the blade and its strength, the invention proposes that:

- the blade extend over a specific distance in a recess formed in the annular structure along the principal axis,
- the cutting edge of the blade be interrupted by a step, so that the blade projects from the internal peripheral surface of the annular structure only over a portion of said specific distance.

Thus, the length of the blade can be increased for a given edge length, which reduces the stresses exerted on the blade.

The invention and its implementation will become even clearer from the following description which is given with reference to the drawings.

BRIEF DESCRIPTION OF THE DRAWINGS

FIG. 1 is a median sectional view of a connecting pipe mounted on a main duct and connected to a secondary duct, FIG. 2 is a front view of a device according to the invention, FIG. 3 is a rear view of the device, FIG. 4 is a sectional view of the device, taken on the plane marked IV—IV in FIG. 2, FIG. 5 is a view of the blade on an enlarged scale, FIG. 6 is a view of the blade, likewise on an enlarged scale, according to the arrow marked VI in FIG. 5, FIG. 7 is a view on an enlarged scale of the detail marked VII in FIG. 4, without the blade.

DETAILED DESCRIPTION OF THE DRAWINGS

FIG. 1 shows a connecting pipe 110 for connecting, via a lateral branch 112, a secondary duct 120 and a principal duct 100 which transport, for example, natural gas for supplying dwellings (individual houses, blocks of flats). The secondary duct 120 and likewise the lateral branch 112 of the connecting pipe 110 are typically produced from plastics material, for example, polyethylene, and have a preferably identical outside diameter. The secondary duct 120 has to be connected to the branch 112 of the connecting pipe 110 and those components are welded to one another, for example, by heating, by way of an external sleeve 130, the inside diameter of which is substantially equal to the outside diameter of the secondary duct 120 and of the branch 112 of the connecting pipe 110. In order to prevent any risk of leakage when the gas starts to flow again, the weld must be completely leak-tight. To that end, a device 10 described hereinafter is used in order to scrape the external surface 115 of the branch 112 and the external surface 125 of the secondary duct 120 over a length at least equivalent to that of a half-sleeve 130. Thus, the external surfaces 115 and 125 of the branch 112 and of the secondary duct 120 are ready for the welding operation on the sleeve 130 (electrical welding) to be carried out under the best possible conditions.

FIG. 2 shows a manual device 10 for scraping by rotation about a tube of plastics material, typically the branch 112 of the connecting pipe 110 and the secondary duct 120 in FIG. 1.

The device 10 is in the form of an annular structure 11 (a ring) which is hollowed out (see FIG. 3) and which is typically produced from plastics material (PVC, for example) and which has a principal axis xx' (see FIG. 4) along which extends an open-ended passage 20 surrounded by a circular wall 12 of the annular structure 11. The annular structure 11 also has a thickness E (see FIG. 4) along the axis xx' and a width L perpendicular to that axis (radially).

The passage 20 has an inside diameter D which is adapted in such a manner that the device 10 can be passed around the tubes 112 and 120 whose external surfaces 115 and 125 are to be scraped, that is to say, slightly larger than the outside diameter of those tubes.

A shoulder 50 located on the surface 12 of the annular structure 11, parallel with the axis xx', reduces locally the passage 20 at one axial end of the annular structure 11. The region 52 for restricting the passage 20, which region is formed by the shoulder 50, has a diameter d smaller than the diameter D at a distance from the shoulder.

The annular structure 11 is also slotted over its entire thickness E and its entire width L so that the plastics material forming the annular structure 11 is in fact interrupted by a slot 13. The slot 13, which is substantially diametrically opposite a blade 30 and which is arranged between regions 16 in the form of recesses provided to enable a user to take the device in his hand, confers the necessary resilience on the device 10 to absorb any defects (ovalisation) in the tubular element 112 to be scraped, both when put in position and during the scraping operation.

In FIGS. 2 and 3, the slot 13 is rectilinear, extends along the principal axis xx' and has a substantially constant width. It could have a slightly V-shaped cross-section.

The blade 30, which is preferably of metal and non-interchangeable (for reasons of cost) extends along the principal axis xx'. It is inserted (for example adhesively bonded) in a recess 14 formed in the annular structure 11. It has a cutting edge 32 projecting slightly from the surface 12 of the annular structure, into the passage 20, in the direction of the principal axis xx' of the device 10.

Near the blade 30, that is to say, downstream in accordance with a direction of rotation of the device having the reference R in FIG. 2 (preferably clockwise), the annular structure 11 has an opening 15 which does not extend over its entire thickness E but which extends through its entire width L, in order to enable a shaving 40 of plastics material formed during the scraping operation to escape from the device 10.

As shown in FIGS. 2 and 5, the blade 30 has, in cross-section, an inwardly curved scallop 34 cooperating with a protuberance 17 having a complementary shape which is provided in the recess 14 of the annular structure 11 in order to lock the blade 30 in rotation along the axis xx' during the scraping operation (if the blade is also adhesively bonded it will be held even more securely).

The blade 30 also has, in cross-section, near its cutting edge 32, an inwardly curved notch 36 which is intended to improve scraping and also the formation and development of the shaving.

The cutting edge 32 of the blade 30 has an axial step 38, substantially at the limit of the opening 15. Thus, the cutting edge 32 extends over a shorter distance than the blade inside the recess 14. The portion not having a cutting edge does not have a scraping function but completes the useful surface of the blade for efficient support in the recess 14. The cutting edge 32 is arranged entirely as an extension of the opening 15.

On the external surface 11a of the annular structure 11, the recessed shapes 16 are provided (see FIGS. 2 and 3) so that a user can place his fingers therein, preferably the thumb and the index finger or the thumb and the middle finger, in order to cause the device 10 to rotate without slipping and in order to be able to adjust manually, owing to the resilience slot 13, the pressure exerted on the device. In the present case, those shapes 16 are rounded and concave and are arranged diametrically opposite one another.

The use of the device 10 thus described is very simple. After positioning the scraper 10 on the tube 112 then 120, or vice versa (the tube 112 is shown with a dot-dash line in FIG. 4 for clarity), it is necessary only to cause it to rotate clockwise about the tube to be scraped (arrow R in FIG. 2), while exerting slight pressure with the ends of the fingers on the shapes 16 in order to cause the scraper to advance.

As illustrated in FIG. 7, where, in order to improve the reading of the Figure, the blade 30 has not been shown, the passage restriction 52 has a diameter d which is smaller than the diameter of the tube before scraping. Thus, a non-scraped portion 112a of the tube abuts a radial face 50a of the shoulder 50.

Since the height s of the projection formed by the cutting edge 32 relative to the wall 12 is greater than the height h of the shoulder 50, a scraped portion 112b of the tube passes without hindrance through the passage restriction 52. The height h of the shoulder 50 is here equivalent to half the difference between the diameters D (of the passage at a distance from the region 52 for restricting the passage) and d (of the passage at the site of that restriction 52).

Owing to the fact that the edge 32 of the blade 30 extends continuously in the passage 20, as far as the limit of the abutment-forming region 52 for restricting the passage and even slightly into that region, the portion 112b of scraped tube is increased continuously (and the reverse is true of the non-scraped region 112a) by maintaining the non-scraped portion supported against the radial surface 50a of the shoulder 50 and causing the scraper 10 to rotate.

In particular, that permits gradual penetration of the scraper 10 on the tubes to be scraped, thus preventing it from being driven in too rapidly (limitation of the advance of the tool) and preventing the creation of a helix generating a surface state unsatisfactory for the later welding operation.

Regular circumferential scraping (with none of the facets and scratches often encountered with traditional manual scrapers) and good removal of the shaving by way of the opening 15 in the ring 11 are thus obtained.

The low unit price of the scraper mass-produced by moulding can make of it an item of equipment which can be discarded after one or more uses.

The invention is in no way limited to the preferred embodiment illustrated by way of example.

Thus, the shoulder, here extending over almost the entire circumference of the passage (except at the site of the opening 15), could be discontinuous and could be constituted notably by (a) stud(s).

The blade could have different forms of cutting edge, could be produced from other materials, could be connected to the annular structure using mechanical means or could also be inclined relative to the axis xx'.

The annular structure could also be of metal or solid.

The number of concave shapes on the external surface of the annular structure may be greater than two (4 arranged opposite one another, for example), notably if the device is fairly large (more than 10 centimetres indiameter, for example, for scraping large-diameter tubes).

Finally, it is optionally possible to provide several blades distributed at regular intervals relative to one another over the inside of the passage.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalent materials, and act-based equivalents and equivalent acts.

We claim:

1. Manual device for scraping by rotation about the external surface of a tube of plastics material, said device comprising:
    (a) an annular structure having a passage which extends along a principal axis and which is delimited by an internal peripheral surface of said annular structure which is to receive said tube tightly in order to guide it,
    (b) a blade secured to said annular structure and having a cutting edge extending beyond said internal peripheral surface to form a projection into said passage,
    wherein said passage extends right through said annular structure and is partially obstructed by a shoulder defining a region restricting said passage, said shoulder having a height, relative to said internal peripheral surface of said annular structure, which is slightly smaller than that of said projection formed by said cutting edge relative to said internal peripheral surface of said annular structure, so that said shoulder defines an abutment for a non-scraped portion of said tube and permits said passage of a scraped portion of said tube through said restriction.

2. Device according to claim 1, wherein said cutting edge extends axially in said passage, at a distance from said shoulder and at least as far as the limit of the region for restricting said passage, and even partially into that region.

3. Device according to claim 1, wherein:
    (a) said annular structure is slightly flexible and has a thickness along the principal axis and a width to that axis,
    (b) said annular structure has a radial slot extending through the entire thickness and the entire width of said annular structure, and
    (c) said radial slot is substantially diametrically opposite said blade.

4. Device according to claim 3, wherein said slot of said annular structure extends substantially along said principal axis of said annular structure.

5. Device according to claim 1, wherein:
    (a) said annular structure has a thickness along the principal axis and a width radial to that axis,
    (b) said annular structure has a radial opening which extends over a portion of the thickness of said annular structure and radially over the entire width of said annular structure, and (c) said blade extends at least partially into or as an extension of said opening in order to remove said shaving formed during the scraping operation.

6. Device according to claim 1, wherein said annular structure is partially hollowed out and is produced from plastics material(s).

7. Device according to claim 1, wherein said annular structure has recessed shapes on its external surface which enable said device to be gripped in the hand, in particular concave shapes adapted to receive the thumb and the index finger or the middle finger of a hand.

8. Device according to claim 1, wherein said blade has, in cross-section, an inwardly curved notch near its cutting edge.

9. Device according to claim 1, wherein said blade is adhesively bonded in a recess in said annular structure and has a scallop or a protuberance, the shape of which is suitable for fitting a complementary shape formed in said recess of said annular structure, in order to lock said blade laterally in rotation.

10. Device according to claim 1, wherein:

(a) said blade extends over a specific distance in a recess formed in said annular structure along the principal axis, and (b) said cutting edge of said blade is interrupted by a step, so that said blade projects from said internal peripheral surface of said annular structure only over a portion of said specific distance.

* * * * *